United States Patent
Park et al.

(10) Patent No.: US 9,712,351 B2
(45) Date of Patent: Jul. 18, 2017

(54) APPARATUS AND METHOD TO ADAPTIVELY SET THRESHOLD TO DETECT TRANSMISSION SYMBOL IN OOK RECEIVER

(71) Applicant: SAMSUNG ELECTRONICS CO., LTD., Suwon-si (KR)

(72) Inventors: Chang Soon Park, Chungju-si (KR); Young Jun Hong, Seoul (KR); Joon Seong Kang, Suwon-si (KR); Jong Han Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 937 days.

(21) Appl. No.: 14/011,470

(22) Filed: Aug. 27, 2013

(65) Prior Publication Data
US 2014/0171002 A1 Jun. 19, 2014

(30) Foreign Application Priority Data
Dec. 13, 2012 (KR) .................. 10-2012-0145338

(51) Int. Cl.
*H04L 27/06* (2006.01)
*H04L 25/06* (2006.01)

(52) U.S. Cl.
CPC .......... *H04L 25/065* (2013.01); *H04L 25/063* (2013.01); *H04L 25/067* (2013.01); *H04L 27/06* (2013.01)

(58) Field of Classification Search
CPC .............................. H03K 5/086; H04L 25/061

USPC ........................................ 375/317, 320, 324
See application file for complete search history.

(56) References Cited

U.S. PATENT DOCUMENTS

| 7,130,366 | B2* | 10/2006 | Phanse | H04B 10/6971 375/229 |
| 7,895,481 | B1* | 2/2011 | Acikel | H04L 25/03006 714/709 |
| 8,054,915 | B2* | 11/2011 | Schwoerer | H03K 5/086 327/18 |
| 2006/0200710 | A1* | 9/2006 | Webb | H04J 14/02 714/704 |
| 2010/0075624 | A1 | 3/2010 | Shanan | |

FOREIGN PATENT DOCUMENTS

| KR | 10-2011-0112878 A | 10/2011 |
| WO | WO 96/37949 A1 | 11/1996 |
| WO | WO 00/01073 A1 | 1/2000 |
| WO | WO 02/067520 A2 | 8/2002 |
| WO | WO 02/071636 A1 | 9/2002 |
| WO | WO 2006/108587 A1 | 10/2006 |
| WO | WO 2007/038782 A1 | 4/2007 |
| WO | WO 2009/046209 A1 | 4/2009 |

\* cited by examiner

*Primary Examiner* — David S Huang
(74) *Attorney, Agent, or Firm* — NSIP Law

(57) ABSTRACT

An apparatus and method are provided to adaptively set a threshold to detect a transmission symbol. The apparatus and method calculate detection parameters to determine the threshold to detect the transmission symbol based on probability distribution parameters, which determine a statistical probability distribution of an input signal. The apparatus and method adaptively detect a present transmission symbol using a previously detected transmission symbol and the detection parameters.

20 Claims, 13 Drawing Sheets

APPARATUS AND METHOD TO ADAPTIVELY SET THRESHOLD TO DETECT TRANSMISSION SYMBOL IN OOK RECEIVER

CROSS-REFERENCE TO RELATED APPLICATION(S)

This application claims the benefit under 35 USC §119(a) of Korean Patent Application No. 10-2012-0145338, filed on Dec. 13, 2012, in the Korean Intellectual Property Office, the entire disclosure of which is incorporated herein by reference for all purposes.

BACKGROUND

1. Field

The following description relates to an apparatus and method to adaptively set a threshold to detect a transmission symbol in an on-off keying (OOK) receiver.

2. Description of Related Art

Owing to high speed development and commercialization of wireless network, a sensor network is rapidly spreading. Also, with respect to institute of electrical and electronics engineers (IEEE), technological standardization such as Bluetooth, IEEE 802.15.4, ZigBee, and the like, is being actively achieved.

Wireless sensor devices may be applied basically to various fields such as home security, medical fields, mobile healthcare, monitoring of chemical/biological abnormality, diagnosis of abnormality and disorder of machinery, environment monitoring, disaster information sensing, intelligent distribution management, real-time security, remote monitoring, and other different or similar fields.

In such various wireless sensor networks and near field communication (NFC) networks, sensors need to be small size. Also, low power consumption and low complexity need to be satisfied for a long time operation with a large number of sensors.

In particular, in a wireless body area network (WBAN), which is installed on a human body to wirelessly communicate with a mobile device or another human body located around, the low complexity and lower power consumption may be more strictly required.

To achieve the low complexity and lower power consumption, an ultra low power (ULP) radio frequency (RF) structure needs to be introduced rather than a conventional high power RF structure. However, when a ULP analog circuit is used, performance reduction may be induced.

SUMMARY

In accordance with an illustrative example, there is provided an apparatus, including a calculation module configured to calculate data detection parameters to determine a threshold to detect the transmission symbol based on probability distribution parameters, wherein the probability distribution parameters define statistical probability distribution of an input signal; and a detection module configured to detect a present transmission symbol using a previously detected transmission symbol and the data detection parameters.

The apparatus further includes an estimation module configured to estimate parameters according to the statistical probability distribution based on a degree of continuity of transmission symbols in the input signal.

The apparatus further includes an estimation module configured to estimate parameters according to the statistical probability distribution using a preamble according to a data pattern.

The detection module is configured to detect the present transmission symbol by selectively applying the data detection parameters based on a degree of continuity of same bits in the previously detected transmission symbol.

The detection module includes a data detection parameter determination unit configured to determine the data detection parameters based on a degree of continuity of same bits in the previously detected transmission symbol; and a present symbol detection unit configured to detect the present transmission symbol using the data detection parameters.

The detection module further includes an initial symbol set unit configured to set an initial value of the previously detected transmission symbol using a symbol value estimated in a time period or a preamble period.

The data detection parameter determination unit is configured to construct a symbol or a symbol sequence using the previously detected transmission symbol, and to determine the data detection parameters using the symbol or the symbol sequence.

The data detection parameter determination unit is configured to determine the data detection parameter based on a probability distribution parameter corresponding to a first probability distribution of when the symbol or symbol sequence is identical to the present transmission symbol and a probability distribution parameter corresponding to a second probability distribution of when the symbol or the symbol sequence is different from the present transmission symbol.

The present symbol detection unit is configured to detect the present transmission symbol, based on the data detection parameter determined from the first probability distribution and the second probability distribution and information on a state of a present received signal.

The apparatus further includes a feedback module configured to feed back information about the present transmission symbol.

In accordance with an illustrative example, there is provided a method, including calculating data detection parameters to determine a threshold to detect the transmission symbol based on probability distribution parameters defining statistical probability distribution of an input signal; and detecting a present transmission symbol using a previously detected transmission symbol and the data detection parameters.

The method further includes estimating parameters according to the statistical probability distribution based on a degree of continuity of transmission symbols in the input signal.

The method further includes estimating parameters according to the statistical probability distribution using a preamble according to a data pattern.

The detecting includes detecting the present transmission symbol by selectively applying the plurality of data detection parameters based on a degree of continuity of same bits in the previously detected transmission symbol.

The detecting includes determining the data detection parameters based on a degree of continuity of same bits in the previously detected transmission symbol; and adaptively detecting the present transmission symbol using the data detection parameters.

The detecting further includes setting an initial value of the previously detected transmission symbol using a symbol value estimated in a time period or a preamble period.

The determining includes constructing a symbol or a symbol sequence using the previously detected transmission symbol, and determining the data detection parameters using the symbol or the symbol sequence.

The determining includes calculating the data detection parameters based on a probability distribution parameter corresponding to a first probability distribution of when a symbol or a symbol sequence is identical to the present transmission symbol and a probability distribution parameter corresponding to a second probability distribution of when the symbol or symbol sequence is different from the present transmission symbol, with respect to a previously detected transmission symbol or symbol sequence candidates randomly constructed; and determining the data detection parameter based on the symbol or the symbol sequence previously detected from the calculated data detection parameters.

The detecting of the present transmission symbol includes detecting the present transmission symbol, based on the data detection parameter determined from the first probability distribution and the second probability distribution and information on a state of a present received signal.

The method further includes feeding back information about the present transmission symbol.

In accordance with another illustrative example, there is provided a non-transitory computer readable recording medium storing a program to implement the method described above.

Other features and aspects will be apparent from the following detailed description, the drawings, and the claims.

Figure 1:
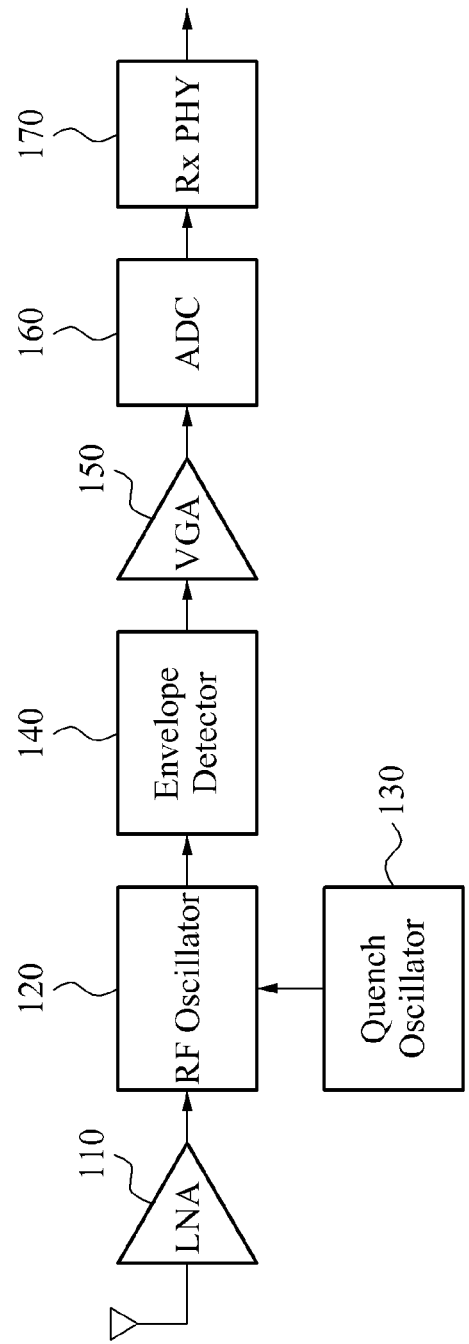
FIG. 1 is a diagram illustrating a low power receiver.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Various sensor devices installed in a wireless sensor network and a near field communication (NFC) network are required to meet conditions of a small size, low power consumption, and low complexity. A general super heterodyne radio frequency (RF) structure may increase performance, such as sensitivity, by utilizing a middle frequency band without converting from a high frequency band directly to a base band. However, by increasing the performance in this manner, complexity, cost, and power consumption may be increased.

In a modem technology of a super heterodyne RF structure, an RF part requires extremely high power in comparison to a digital baseband part. For example, to process a digital signal, a modem chip for low power wireless personal area network (WPAN) (IEEE 802.15.4) requires about 0.5 mW to receive and to transmit. Conversely, processing an analog signal consumes about 21 mW in a receiving mode and about 30 mW in a transmitting mode, that is, about 40 to 60 times higher than the digital signal processing part.

Therefore, a super regenerative receiver having a simple RF structure that uses a small number of active elements could be used as an ultra low power (ULP) receiver. The super regenerative receiver detects a signal by amplifying an output signal using a positive feedback structure with respect to received signals. For low power consumption and low complexity, a non-coherent modulation technology may be effective. For example, modulation methods such as non-coherent on-off keying (OOK) or non-coherent frequency shift keying (FSK) may determine presence of signals by an envelope detector.

The non-coherent modulation and demodulation methods show relatively low performance in comparison to coherent modulation and demodulation methods. However, executing synchronization, which requires a high cost, to obtain an accurate carrier phase value may be omitted. In addition, the non-coherent modulation and demodulation methods may omit use of components that requires high power, such as a mixer or a linear amplifier, which are needed in an in-phase/quadrature-phase (I/Q) structure. Accordingly, the non-coherent modulation and demodulation methods may save power and reduce structural complexity. For instance, an RF receiver for ULP reception and transmission may apply a low power low complexity modulation technology, such as non-coherent OOK.

An NFC transmission system using the low power and low complexity RF structure and modulation method may considerably reduce power consumption. However, due to performance reduction when processing an analog signal and non-ideal characteristics, performance of the entire system may be reduced.

Hereinafter, a general configuration of a super regenerative receiver as an example of a low power receiver will be described.

FIG. 1 illustrates configuration of a super regenerative receiver.

Referring to FIG. 1, an RF signal passes through a low noise amplifier (LNA) 110 and through an RF oscillator 120. In one illustrative example, the RF oscillator 120 is a super regenerative oscillator (SRO). The RF oscillator 120 amplifies the RF signal corresponding to a particular frequency by a positive feedback loop.

However, because amplification causes oscillation, an operation to stop the oscillation is needed. In one example, a quench oscillator 130 may control periodic occurrence and disappearance of the oscillation. For example, when the non-coherent OKK modulation is applied and a transmission end transmits a signal corresponding to a transmission symbol "1", the RF oscillator 120 generates a relatively large oscillation signal controlled by the quench oscillator 130. Conversely, when the transmission end transmits a signal corresponding to a transmission symbol "0," the RF oscillator 120 may not ideally oscillate but may actually generate a weak oscillation signal due to noise.

The oscillation signals may be supplied as input signals of the envelope detector 140. When the input signals are passed through the envelope detector 140, an envelope of the oscillation signal generated at a high frequency may be detected as an output.

Because the output signal of the envelope detector 140 has a very low intensity, high amplification is required to detect a signal in a digital baseband. Amplification intensity of the output signal of the envelope detector 140 would be adjusted according to a distance between a transmitter and a receiver. Therefore, the output signal passes through a variable gain amplifier (VGA) 150 configured to perform amplification by adjusting the amplification intensity.

In one example, the VGA 150 amplifies the output signal up to intensity of about 40 dB. Therefore, when the output signal of the envelope detector 140 includes DC offset components, the output signal may saturate an entire circuit when excessively amplified. That is, different from a coherent modulation method, a non-coherent OOK modulation signal passing through the envelope detector 140 obtains a positive output signal.

Next, the signal amplified through the VGA 150 passes through an analog to digital converter (ADC) 160 and is then provided to a receiving physical layer (Rx PHY) 170.

Signal waveforms of blocks constituting the super regenerative receiver will be described with reference to FIG. 2.

Figure 2:
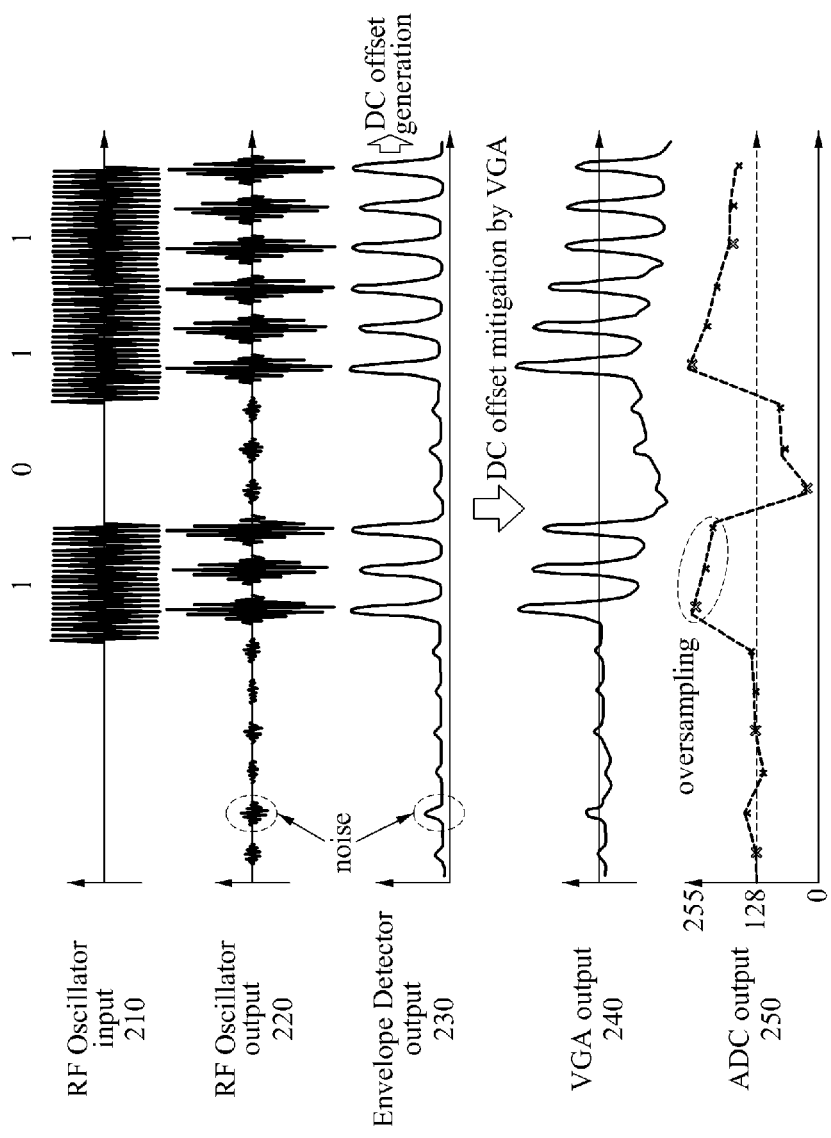
FIG. 2 is a diagram illustrating signal waveforms of blocks of the low power receiver of FIG. 1.

FIG. 2 illustrates signal waveforms of blocks of the super regenerative receiver of FIG. 1.

FIG. 2 shows an oscillating output waveform 220 with respect to a case in which an RF oscillator performs oversampling three times for every particular transmission symbol modulated by non-coherent OOK, which is the input signal 210. The ADC may have the output waveform 250 having a digital output value from 0 to 255 using a 8-bit resolution bit.

As shown in FIG. 2, an output signal 230 of an envelope detector always has a positive value. Therefore, to remove the DC offset components and maintain low power consumption, a VGA 240 may be configured to have frequency response characteristics to remove or suppress low frequency components. Therefore, the waveform of an output signal 240 of the VGA may have a mean value of '0' and swing in both directions to a negative value and a positive value.

Because the DC offset is apt to be mitigated, when same transmission symbols out of "0" and "1" are successively transmitted, the output signal 240 of the VGA may not maintain amplitude of the particular transmission symbol but tend to approximate towards the mean value, that is, zero volt. Therefore, although the DC offset components are removed for a considerably long period, a DC offset value may fluctuate during a time period per symbol depending whether particular transmission symbols successively occur.

In case of the non-coherent OOK modulation and demodulation, to determine whether the transmission symbol is "0(off)" or "1(on)," setting of a threshold determining presence of signals may highly influence a bit error rate. Therefore, the characteristics of the VGA, that is, mitigation of the DC offset, may cause distortion of the output signal 250 of the ADC, that is, an input value of the digital baseband, thereby reducing the bit error rate.

To this end, according to an illustrative configuration, a threshold may be adaptively set to efficiently cope with time-varying DC offset fluctuation in the low power non-coherent OOK receiver, thereby increasing the bit error rate. In addition, the various configurations described below may be applied to a super regenerative receiver and to other modulation and demodulation methods besides the non-coherent OOK method and the coherent method.

Figure 3:
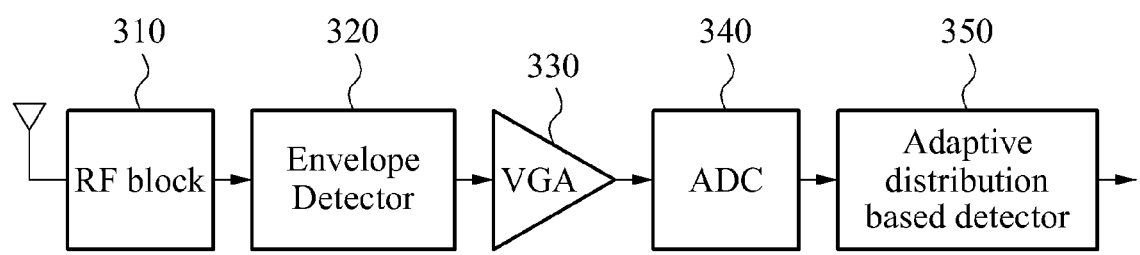
FIG. 3 is a diagram illustrating an example structure of a low power receiver including an apparatus that adaptively sets a threshold to detect a transmission symbol, in accordance with an illustrative configuration.

FIG. 3 illustrates an example of a configuration of a low power receiver including an apparatus to adaptively set a threshold to detect a transmission symbol, in accordance with an illustrative example.

As aforementioned, the time-varying DC offset fluctuation may reduce reception efficiency. The time-varying DC offset fluctuation may be expressed by other types of probability distributions depending on successive occurrence of the particular transmission symbol.

An example related to the above will be described.

For example, in one case, a noise is ignored and the DC offset fluctuation is absent. When the transmission symbol is "1," an ADC output corresponding to a baseband input may have a value A. When the transmission symbol is "0," the ADC output may have a value B. The value A may be greater than the value B. In this case, when the DC offset component of an ADC input signal is zero, the ADC output may have a mid value between A and B.

A case in which the DC offset fluctuation is present will now be described.

When a first transmission symbol is "1" and a second transmission symbol is also "1," the ADC output with respect to the second transmission symbol may be smaller than the value A when the noise is ignored. This phenomenon may be caused due to the VGA, that is, a signal processing block that mitigates the DC offset operating at a front end of the ADC to reduce power consumption and prevent saturation of the entire circuit. Although the ADC output has the value A in the beginning, when the same symbols successively occur, the ADC output is apt to regress to a mean value of the two transmission symbols, that is, the mid value between A and B, to mitigate the DC offset. According to the same principle, when the first transmission symbol is "0" and the second transmission symbol is also "0," and the noise is ignored, the ADC output with respect to the second transmission symbol may be greater than the value B.

When different transmission symbols alternately occur rather than the same transmission symbols successively occurring, the ADC output maintains the values A and B in an alternating manner. That is, the values A and B are shown in the alternating manner when the DC offset value is absent. Therefore, different types of probability distribution may be caused according to whether a previous bit and a present bit are same or different. According to an illustrative example, performance reduction caused by the DC offset fluctuation may be overcome using the probability distribution according to a degree of continuity of the same transmission symbols in detection of bits.

Referring to FIG. 3, a receiver includes an apparatus or adaptive distribution based detector 350 adaptively setting a threshold to detect a transmission symbol. Hereinafter, the apparatus 350 will be referred to as a "setting apparatus 350." However, apparatus 350 may also be referred to as "adaptive distribution based detector," or the like.

In FIG. 3, a signal received via an antenna is transmitted through an envelope detector 320 and a VGA 330. Next, the signal is converted to a digital signal through an ADC 340, and then passed through the setting apparatus 350.

As aforementioned, to prevent generation of the DC offset and maintain low power consumption, the VGA 330 is configured to have frequency response characteristics for suppressing low frequency components. The setting apparatus 350 increases accuracy or performance to detect received signals, which may have been affected due to time-varying DC offset fluctuation caused by the frequency response characteristics of the VGA 330.

The configuration of the setting apparatus 350 will be described in detail with reference to FIG. 4.

Figure 4:
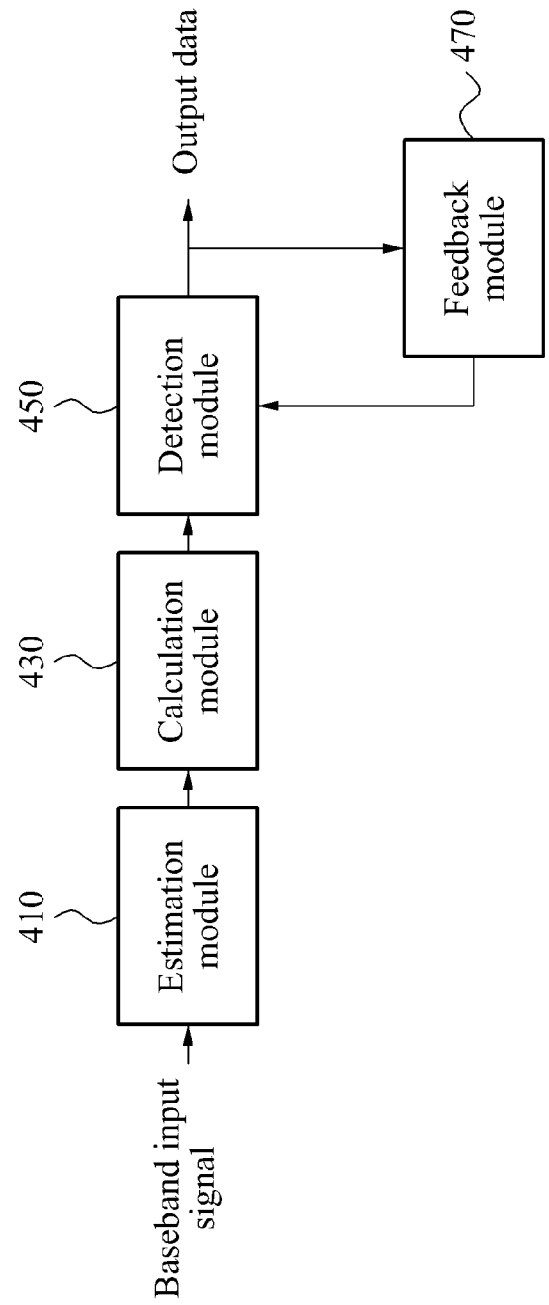
FIG. 4 is a block diagram illustrating an example of an apparatus that adaptively sets a threshold to detect a transmission symbol, in accordance with an illustrative configuration.

FIG. 4 illustrates an example of structural configuration of the setting apparatus 350 of FIG. 3 to adaptively set a threshold to detect a transmission symbol, in accordance with an illustrative configuration. Referring to FIG. 4, the setting apparatus 350 includes an estimation module 410, a calculation module 430, a detection module 450, and a feedback module 470.

The estimation module 410 estimates probability distribution parameters that determine a statistical probability distribution of an input signal. The input signal may be a baseband input signal passed through the ADC 340 of FIG. 3. The probability distribution parameters or distribution parameters determining the statistical probability distribution denotes a probability distribution of a presently received signal when a detected symbol or symbol sequence is provided. For example, in case of Gaussian distribution, a mean and distribution determining the Gaussian distribution are the probability distribution parameters or distribution parameters. Prior to estimation of a present transmission bit, whether a transmission bit is 0 or 1 may be estimated.

The setting apparatus 350 obtains a probability distribution parameter of when the present transmission bit is "0" based on a past symbol and a probability distribution parameter of when the present transmission bit is "1." Also, the setting apparatus 350 may obtain two different probability distributions.

The estimation module 410 estimates parameters according to a statistical probability distribution based on a degree of continuity of particular transmission symbols in the input signal. In addition, for example, the estimation module 410 estimates the parameters according to the statistical probability distribution using a preamble according to a predetermined data pattern.

The calculation module 430 calculates a plurality of data detection parameters to determine the threshold to detect the transmission symbol. In one illustrative example, after an estimation of the probability distribution through the probability distribution parameters is complete, the data detection parameters refer to parameters necessary to detect present or current data through two probability distributions to estimate a present transmission bit.

For example when two Gaussian probability distributions are obtained, an optimal data parameter may be intensity of a signal at intersection of the two probability distributions. The intensity may be referred to as a threshold. The threshold may be compared with an intensity of the present received signal. When the intensity of the present received signal is greater than the threshold, the data detection is determined to be "1." When the intensity is smaller than the threshold, the data detection is determined to be "0."

In addition, for example, when symbol detection information of a point before one step is used, a set of present bit to be estimated and previously estimated bit may include four cases of (0,0), (0,1), (1,0), and (1,1).

In case of the Gaussian distribution, a process to obtain all probability distribution parameters with respect to the four cases, for example, means and distributions of the four cases is referred to as a probability distribution parameter estimation process.

Next, the data detection is performed. When the previously detected bit information is "0," an intersection of two probability distributions corresponding to two cases (0,0) and (1,0) is obtained to detect whether the present bit information is "0" or "1." A threshold corresponding to the intersection may be a first data detection parameter.

When the previously detected bit information is "1," an intersection of the two probability distributions corresponding to two cases (0,1) and (1,1) may be obtained to detect whether the present bit information is "0" or "1." A threshold corresponding to the intersection may be another data detection parameter.

In other words, the threshold may be varied depending on whether the previously detected bit information is "0" or "1," and accordingly the threshold, that is, the data detection parameter, may be properly determined. In an illustrative configuration, because the comparison may be considered in other ways than the comparison with the threshold, the term data detection parameter' is used as a general term.

That is, the probability distribution parameter is a factor that determines a plurality of probability distribution shapes. The data detection parameter is a parameter indicating the threshold obtained from two probability distributions shapes.

The detection module 450 may adaptively detect the present transmission symbol using the previously detected transmission symbol and the plurality of data detection parameters.

The detection module 450 may detect the present transmission symbol by selectively applying the plurality of data detection parameters based on a degree of continuity of same bits in the previously detected transmission symbol.

For example, the detection module 450 is configured to adaptively detect the transmission symbol. In detail, the detection module 450 acknowledges the degree of continuity of the same bits in the previously detected transmission symbol, and then selectively applies the data detection parameters according to the degree of continuity, thereby detecting the present transmission symbol. The present transmission symbol detected from the detection module 450 may be provided to the feedback module 470 for a transmission symbol detection to be performed next time. The configuration of the detection module 450 will be described in detail with reference to FIG. 5.

In one example, the term 'transmission symbol' may be defined as a symbol transmitted from a transmission end and received by a receiving end from the transmission end. For example, the transmission symbol corresponds to a binary bit such as "0" and "1," or may include a symbol sequence such as "00" and "10."

The term 'previously detected transmission symbol' may be defined as a transmission symbol detected before feedback from the feedback module 470.

The feedback module 470 may feed back to the detection module 450 information on the present transmission symbol detected by the detection module 450.

Figure 5:
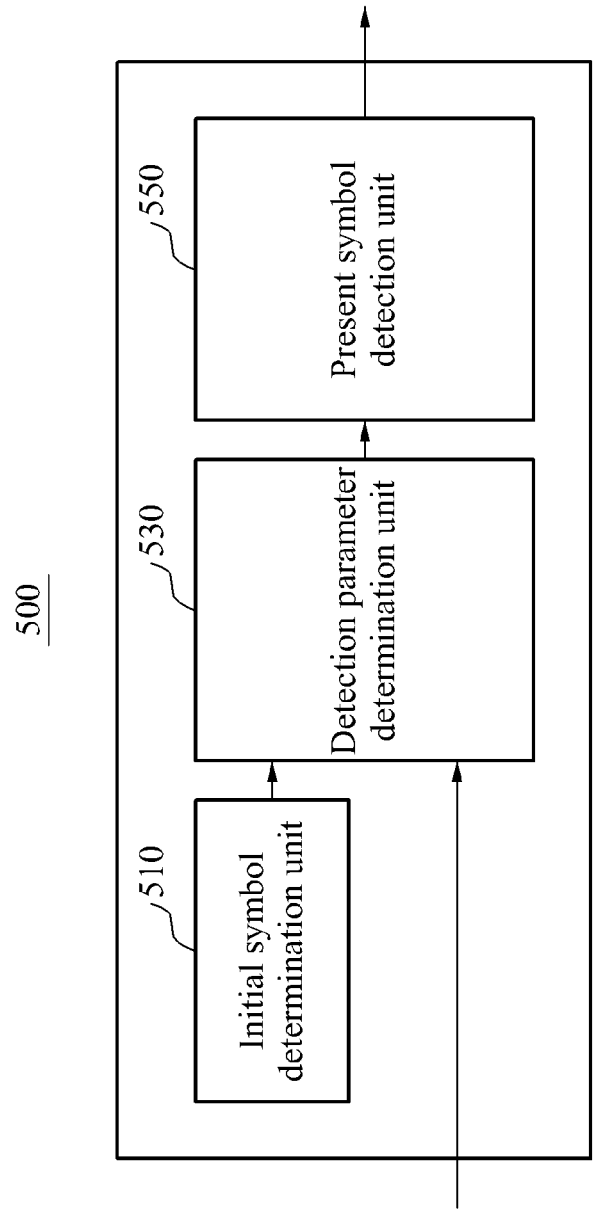
FIG. 5 is a block diagram illustrating an example of a detection module included in an apparatus that adaptively sets a threshold to detect a transmission symbol, in accordance with an illustrative configuration.

FIG. 5 illustrates an example of a detection module 500 included in an apparatus that adaptively sets a threshold to detect a transmission symbol, in accordance with an illustrative example.

Referring to FIG. 5, the detection module 500, according to an illustrative example, may include an initial symbol determination unit 510, a detection parameter determination unit 530, and a present symbol detection unit 550.

The initial symbol determination unit 510 sets an initial value of a previously detected transmission symbol using a symbol value estimated in a predetermined time period or a preamble period. For example, the initial symbol determination unit 510 increases reliability of estimation of the symbol value using a cyclic redundancy check (CRC) in the preamble period. That is, the initial symbol set unit 510 confirms whether the estimated symbol value is correct using the CRC.

The detection parameter determination unit 530 determines a plurality of data detection parameters based on a degree of continuity of same bits in the previously detected transmission symbol.

The detection parameter determination unit 530 constructs a symbol or symbol sequence using the previously detected transmission symbol, and determines the plurality of data detection parameters using the symbol or symbol sequence.

The detection parameter determination unit 530 determines a data detection parameter based on a probability distribution parameter corresponding to a first probability distribution of when the symbol or symbol sequence is presumed to be identical to a present transmission symbol, and a probability distribution parameter corresponding to a second probability distribution of when the symbol or symbol sequence is presumed to be different from the present transmission symbol.

For example, when the previously detected transmission symbol is "0," a case (0,0) corresponds to the first probability distribution and a case (1,0) corresponds to the second probability distribution. When the previously detected transmission symbol is "1," a case (0,1) corresponds to the first probability distribution and a case (1,1) corresponds to the second probability distribution. In one illustrative example, the data detection parameter is determined based on two probability distributions.

The present symbol detection unit 550 adaptively detects the present transmission symbol using the plurality of data detection parameters detected.

The present symbol detection unit 550 detects a symbol having a higher occurrence rate as the present transmission symbol based on the data detection parameter determined from the first probability distribution and the second probability distribution and information on a state of the present transmission symbol. For example, when the previously detected transmission symbol is "0," the threshold corresponding to the data detection parameter may be obtained based on the first probability distribution corresponding to (0,0) and the second probability distribution corresponding to (1,0). When intensity of a present received signal is larger than the threshold, the present transmission symbol may be estimated as "1" because a probability that "1" has been transmitted is higher. Conversely, when the intensity of the present received signal is smaller than the threshold, the present transmission symbol is estimated as "0" because a probability that "0" has been transmitted is higher.

The information on the state of the present received signal may include amplitude of the received signal.

Figure 6:
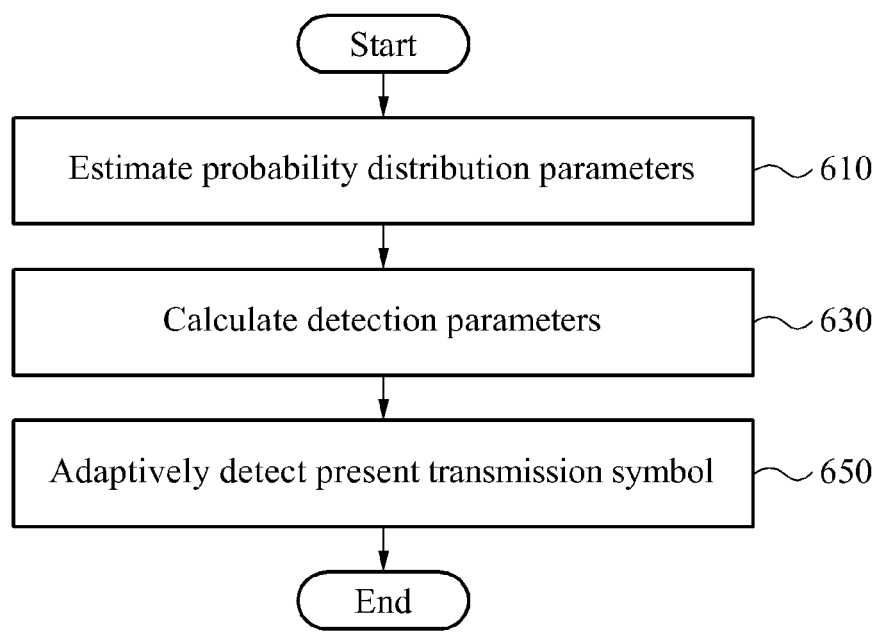
FIG. 6 is a flowchart illustrating an example of a method of adaptively setting a threshold to detect a transmission symbol, in accordance with an illustrative configuration.

FIG. 6 illustrates an example of a method to adaptively set a threshold to detect a transmission symbol, in accordance with an illustrative example.

Referring to FIG. 6, in operation 610, the method performed, for instance, at a setting apparatus according to an embodiment, estimates probability distribution parameters that determine statistical probability distribution of an input signal, that is, distribution parameters.

The method estimates a factor determining the probability distribution of a present transmission symbol influenced by a degree of continuity of particular transmission symbols, that is, the probability distribution parameters determining the statistical probability distribution of the input signal. For example, the method estimates the probability distribution parameters determining the statistical probability distribution of the input signal through transmission of a preamble according to a predetermined data pattern.

In operation 630, the method calculates a plurality of data detection parameters used to determine the threshold to detect the transmission symbol based on the distribution parameters estimated in operation 610.

In operation 650, the method adaptively detects the present transmission symbol using a previously detected transmission symbol and the plurality of data detection parameters.

Figure 7:
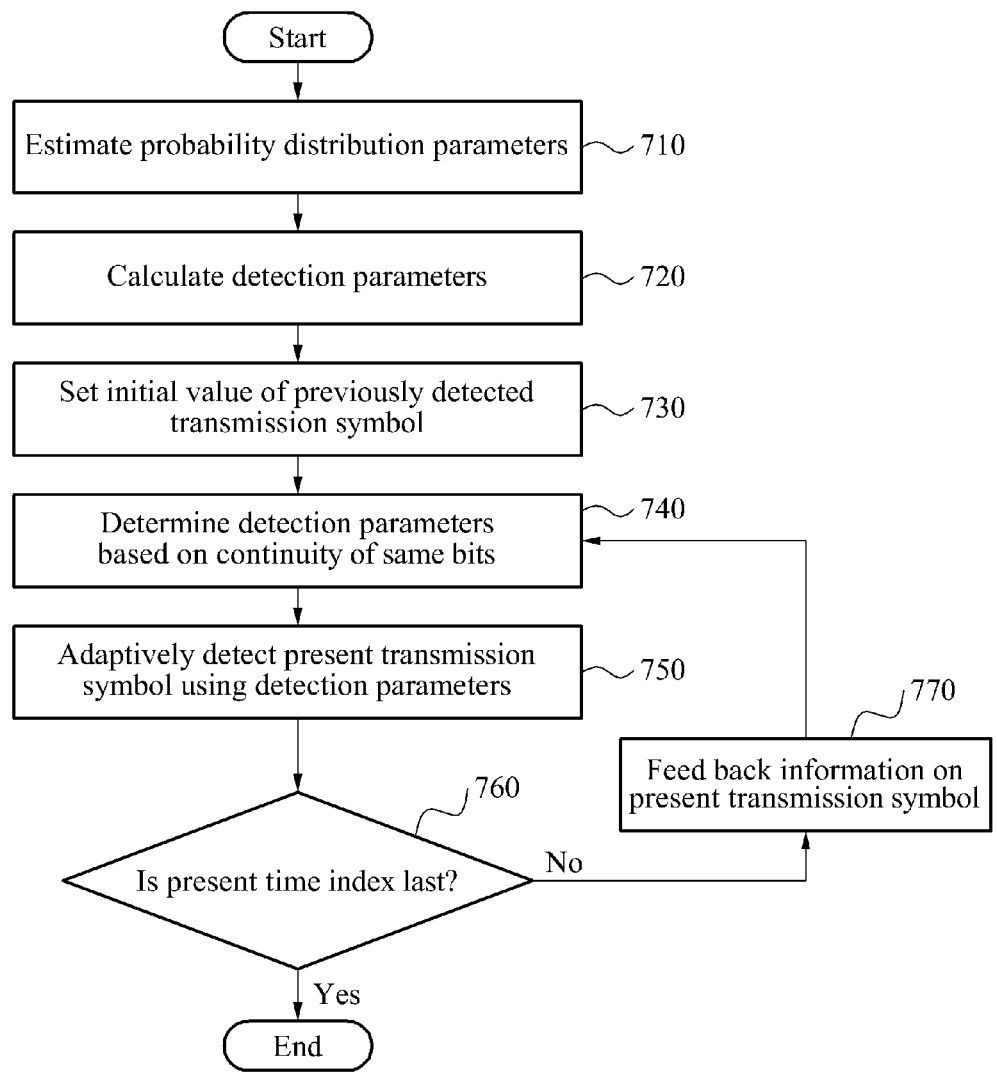
FIG. 7 is a flowchart illustrating another example of a method to adaptively set a threshold to detect a transmission symbol, in accordance with an illustrative configuration.

FIG. 7 illustrates another example of a method to adaptively set a threshold to detect a transmission symbol, in accordance with an illustrative example.

Referring to FIG. 7, in operation 710, the method performed, for instance, at a setting apparatus according to another embodiment, estimates probability distribution parameters that determine a statistical probability distribution of an input signal, that is, distribution parameters.

The method estimates a factor determining a probability distribution of a present transmission symbol influenced by a degree of continuity of particular transmission symbols, that is, the probability distribution parameters determining the statistical probability distribution of the input signal.

For example, the method estimates the probability distribution parameters determining the statistical probability distribution of the input signal through transmission of a preamble according to a predetermined data pattern.

In operation 720, the method calculates a plurality of data detection parameters used to determine the threshold to detect the transmission symbol, based on the distribution parameters estimated in operation 710. The method calculates the plurality of data detection parameters according to the degree of continuity of the particular transmission symbols, based on the probability distribution parameters determining the statistical probability distribution of the input signal estimated in operation 710.

Next, the method performs an initial symbol estimation. That is, in operation 730, the method sets an initial value of a previously detected transmission symbol using a symbol value estimated in a predetermined time period or a preamble period.

When the method is executed for the first time, a feedback value from a previous time period, that is, the 'previously detected transmission symbol' may not exist. In this case, the initial symbol or initial symbol sequence may be set using the symbol value estimated in the predetermined time period or the preamble period.

In one example, when estimating the symbol value in the predetermined time period or the preamble period, CRC may be used to set the initial symbol or initial symbol sequence more reliably.

The method determines a data detection parameter necessary to detect the present transmission symbol through the previously detected transmission symbol or transmission symbol sequence.

In operation 740, the method determines the plurality of data detection parameters based on a degree of continuity of same bits in the previously detected transmission symbol.

In operation 750, the method adaptively detects the present transmission symbol using the plurality of data detection parameters determined in operation 740. That is, the present transmission symbol is adaptively estimated based on the data detection parameters determined in operation 740. Information on the present transmission symbol may be continuously fed back to be used to detect following symbols.

Next, in operation 760, the method determines whether a present time index indicating a time period is final. If the present time index is final, the method ends the operation. If the present time index is not final, the method feeds back the information about the present transmission symbol detected in operation 750, in operation 770, and then performs operation 740.

A method to adaptively detect the present transmission symbol in operation 750 after determining the data detection parameters in operation 740 will be described in detail with reference to FIGS. 9 to 11.

Figure 8:
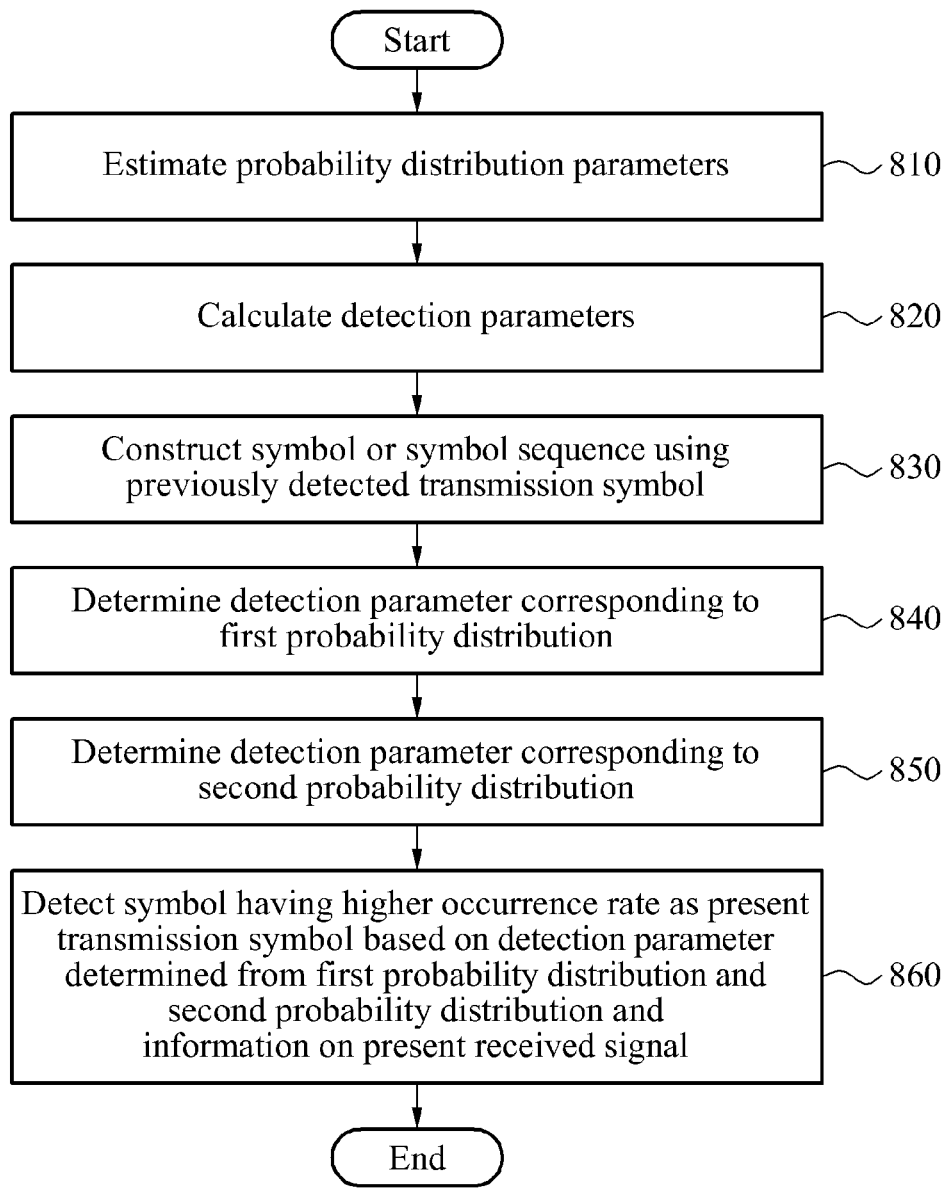
FIG. 8 is a flowchart illustrating still another example of a method to adaptively set a threshold to detect a transmission symbol, in accordance with an illustrative configuration.

FIG. 8 illustrates still another example of a method to adaptively set a threshold to determine a transmission symbol, in accordance with an illustrative example.

Referring to FIG. 8, in operation 810, a method performed, for instance, by a setting apparatus according to still another embodiment, estimates probability distribution parameters determining a statistical probability distribution of an input signal, that is, distribution parameters. The setting apparatus estimates a factor determining the probability distribution of a present transmission symbol influenced by a degree of continuity of particular transmission symbols, that is, the probability distribution parameters determining the statistical probability distribution of the input signal.

In operation 820, the method calculates a plurality of data detection parameters to determine the threshold to detect the transmission symbol based on the distribution parameters estimated in operation 810.

Next, the method adaptively detects the present transmission symbol using a previously detected transmission symbol. For this, in operation 830, the method constructs a symbol or symbol sequence using the previously detected transmission symbol.

In operation 840, the method determines a data detection parameter corresponding to a first probability distribution of when the symbol or symbol sequence constructed in operation 830 is presumed to be identical to the present transmission symbol. Additionally, in operation 850, the method determines a data detection parameter corresponding to a second probability distribution of when the symbol or symbol sequence constructed in operation 830 is presumed to be different from the present transmission symbol.

In operation 860, the method detects a symbol having a higher occurrence rate as the present transmission symbol based on the data detection parameter determined from the first probability distribution and the second probability distribution and on information on a state of a present received signal.

The information on the state of the present received signal may include amplitude of the received signal.

Furthermore, the method calculates the plurality of data detection parameters based on a probability distribution parameter corresponding to the first probability distribution and a probability distribution parameter corresponding to the second probability distribution, and with respect to a plurality of previously detected transmission symbol or symbol sequence candidates that may be different according to circumstances. Next, the method determines the data detection parameter based on the symbol or symbol sequence previously detected from the plurality of data detection parameters being calculated.

The probability distribution parameter corresponding to the first probability distribution may be the probability distribution parameter of when the symbol or symbol sequence constructed in operation 830 is presumed to be identical to the present transmission symbol. The probability distribution parameter corresponding to the second probability distribution may be the probability distribution parameter of when the symbol or symbol sequence constructed in operation 830 is presumed to be different from the present transmission symbol.

Figure 9:
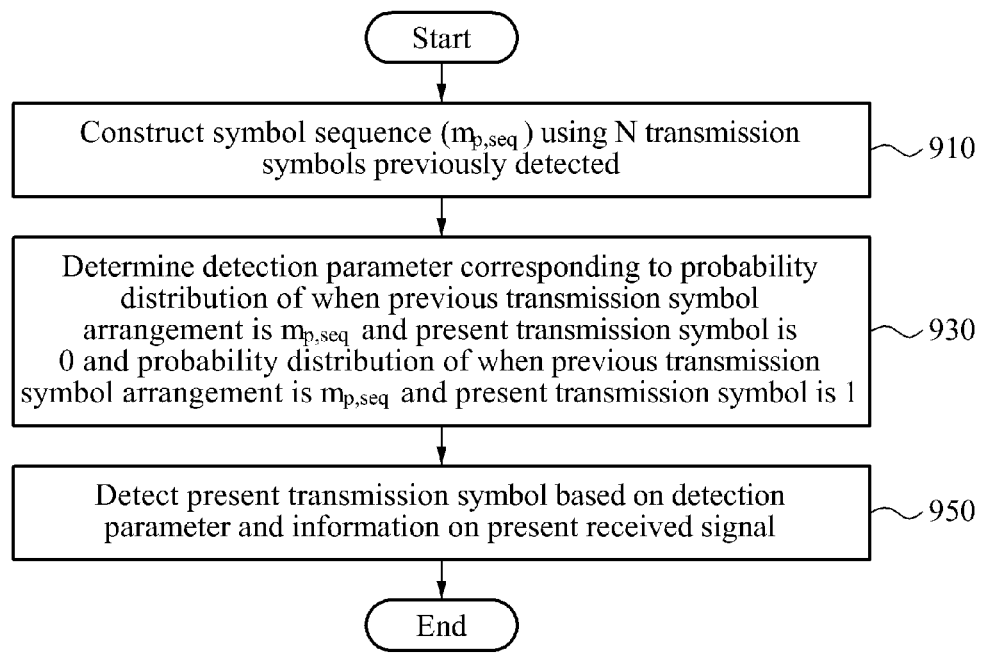
FIG. 9 is a flowchart illustrating an example of a method to adaptively detect a present transmission symbol using a plurality of data detection parameters when a plurality of transmission symbols are used, in accordance with an illustrative configuration.

FIG. 9 illustrates an example of a method to adaptively detect a present transmission symbol using a plurality of data detection parameters when a plurality of transmission symbols is used, in accordance with an illustrative example. The method previously detects the plurality of transmission symbols to adaptively set a threshold to detect a transmission symbol.

Referring to FIG. 9, in operation 910, the method at a setting apparatus, for instance according to an embodiment, receives feedback of all of an N-number of transmission symbols previously detected, and constructs a symbol sequence $m_{p,seq}$ using the fed back transmission symbols. The symbol sequence $m_{p,seq}$ includes information on all of the N transmission symbols detected until a very previous time.

In one instance, the method constructs the symbol or symbol sequence by receiving the feedback of the previously detected transmission symbols.

The method constructs the symbol sequence by receiving feedback of the previously estimated symbol values, for example, from a previous time.

The symbol sequence $m_{p,seq}$ including the N transmission symbols are constructed by collecting previously detected symbol values. A method to determine a data detection parameter with respect to the symbol sequence $m_{p,seq}$ will be described hereinafter.

For example, in operation 930, the method determines the data detection parameter to correspond to a first probability distribution presuming that the symbol sequence transmitted until the very previous time is $m_{p,seq}$ and that the present transmission symbol is "0" and a second probability distribution presuming that the symbol sequence transmitted until the very previous time is $m_{p,seq}$ and that the present transmission symbol is "1."

After determination of the data detection parameter is completed, in operation 950, the method estimates the present transmission symbol as a symbol having a higher occurrence rate based on the determined data detection parameter and information on a state of a present received signal.

The state information of the received signal includes amplitude of the received signal. The probability distribution parameters determining the probability distribution are obtained by estimating a probability distribution of the present received signal with respect to all of a plurality of previous transmission symbol sequences and the present transmission symbol which may have different values.

In addition, when a transmission symbol $m_p$ detected just before has a value "0" or "1," the data detection parameters are determined in a following method.

The method determines whether the transmission symbol $m_p$ detected at a very previous time is "0." As a result of the determination, when the transmission symbol $m_p$ detected at the very previous time is "0," the method determines the data detection parameter corresponding to the first probability distribution presuming that an n-number of same transmission symbols "0" have been transmitted until the last time and the present transmission symbol is also "0" and the second probability distribution presuming that the transmission symbol "0" is transmitted at a previous time and the present transmission symbol is "1."

For example, the first probability distribution corresponds to a case in which an (n+1)-number of symbols "0" successively occur. The second probability distribution corresponds to a case in which the present transmission symbol is non-continuous from the previous transmission symbol.

However, conversely, when the transmission symbol $m_p$ detected at the previous time is "1" as a result of the determination, the method determines the data detection parameter corresponding to a third probability distribution assuming that the n-number of same transmission symbols "1" have been transmitted until the last time and the present transmission symbol is also "1". The method also determines the data detection parameter corresponding to a fourth probability distribution assuming that the transmission symbol "1" is transmitted at the very previous time and the present transmission symbol is "0."

After the data detection parameter is determined through the foregoing processes, the method detects the symbol having a higher occurrence rate as the present transmission symbol based on the state information of the present received signal.

As aforementioned, the process of determining the data detection parameter needs data detection parameters corresponding to the probability distributions. Therefore, the data detection parameters corresponding to the probability distributions may be estimated in a following manner.

It is assumed that the n-number of transmission symbols having the same value as the transmission symbol $m_p$ detected previously, for example until the last time are continuously transmitted. In one instance, n is a random number and a maximum limit of n is N.

When the transmission symbol $m_p$ is "0," an (N+1)-number of probability distributions of the received transmission symbols may be considered to the maximum. That is, assuming that a present transmission time is i-th time, one probability distribution of when "0" is transmitted at (i−1)th time and "1" is transmitted at i-th time and an N-number of probability distributions of when an n-number of "0" successively occur before and "0" is also transmitted at the i-th time.

The N-number of probability distributions may include a probability distribution of the received signal of when "1", "0", and "0" are transmitted respectively at (i−2)th, (i−1)th, and i-th times, a probability distribution of the received signal of when "1", "0", "0", and "0" are transmitted respectively at (i−3)th, (i−2)th, (i−1)th, and i-th times, and a probability distribution of the received signal of when only "0" are continuously transmitted from (i−N)th time to (i−1)th time and "0" is also transmitted at i-th time.

When the transmission symbol $m_p$ is "1", the (N+1)-number of probability distributions of the received transmission symbols may be considered. Therefore, the number of data detection parameters corresponding to probability distributions to be estimated overall may be 2N+2.

When N is set most simply to 1 to estimate the probability distribution, the symbol value is estimated until a previous symbol. That is, a case in which the transmission symbol is continuous to the previous symbol with the same value and a case may be considered in which the transmission symbol is not continuous to the previous symbol. In one example, the previous symbol may be the very previous symbol or immediate previous symbol.

Thus, when the number of the previously detected transmission symbol is 1, the data detection parameter is determined. A method to adaptively detect the present transmission symbol using the data detection parameter will be described as shown in FIG. 10.

Figure 10:
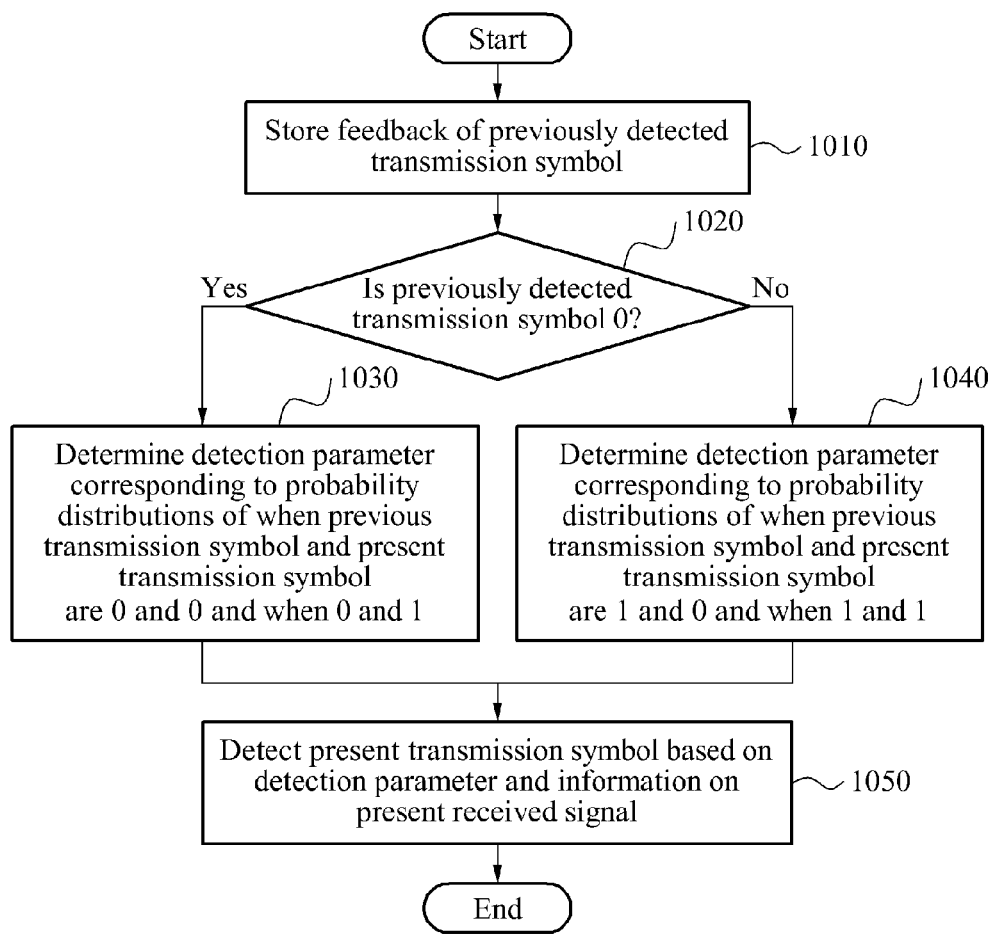
FIG. 10 is a diagram illustrating an example of a method to adaptively detect a present transmission symbol when one transmission symbol is used, in accordance with an illustrative configuration.

FIG. 10 illustrates an example of a method to adaptively detect a present transmission symbol when one transmission symbol is previously detected by the method to adaptively set a threshold to detect a transmission symbol.

Referring to FIG. 10, when the number of the previously detected transmission symbol, for example at a previous time, is 2, a setting apparatus receives feedback of the previously detected transmission symbol and stores the previously detected transmission symbol in operation 1010.

Next, in operation 1020, the method determines the previously detected transmission symbol as "0."

In operation 1030, when the previously detected transmission symbol is "0" in operation 1020, the method performed, for example, at the setting apparatus, determines the data detection parameter corresponding to a probability distribution of when the previous transmission symbol and the present transmission symbol are "0" and "0," respectively, and a probability distribution of when the previous transmission symbol and the present transmission symbol are "0" and "1," respectively. In one illustrative example, the previous transmission symbol may include a very previous transmission symbol or an immediate previous transmission symbol.

In operation 1040, when the previously detected transmission symbol is "1" in operation 1020, the method determines the data detection parameter corresponding to a probability distribution of when the very previous transmission symbol and the present transmission symbol are "1" and "0," respectively, and a probability distribution of when the very previous transmission symbol and the present transmission symbol are "1" and "1," respectively.

In operation 1050, the method detects the symbol having a higher occurrence rate as the present transmission symbol based on the data detection parameter selected in operation 1030 or operation 1040 and the state information of the present received signal.

Figure 11:
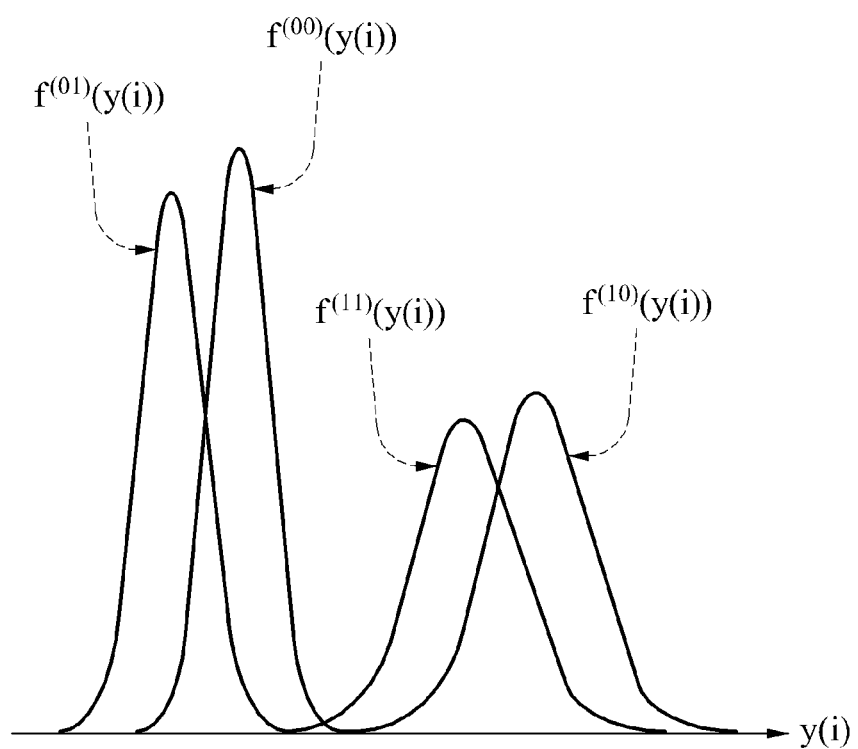
FIG. 11 is a diagram illustrating an example of a method to determine a data detection parameter corresponding to a probability distribution according to the method of adaptively setting a threshold to detect a transmission symbol, in accordance with an illustrative configuration.

FIG. 11 illustrates an example of a method to determine a data detection parameter corresponding to a probability distribution in accord with the method of adaptively setting a threshold to detect a transmission symbol, in accordance with an illustrative example.

Referring to FIG. 11, a probability density function (pdf) of a received signal y(i) with respect to a transmission symbol m(i) in an i-th present time period will be described.

In one example, a total of four pdfs may be considered, that is, $f^{(01)}(y(i))$, $f^{(00)}(y(i))$, $f^{(11)}(y(i))$, and $f^{(10)}(y(i))$. The four pdfs $f^{(01)}(y(i))$, $f^{(00)}(y(i))$, $f^{(11)}(y(i))$, and $f^{(10)}(y(i))$ may correspond to probability distributions of cases in which a set the i-th transmission symbol m(i) and an (i−1)th transmission symbol m(i−1) is (0,1), (0,0), (1,1), and (1,0), respectively.

For example, $f^{(10)}(y(i))$ may denote a pdf of the received signal y(i) when the previously detected transmission symbol is "0" and the present transmission symbol is "1."

In this case, to estimate the transmission symbol m(i) of the i-th time, the previously detected transmission symbol may be expressed as $\hat{m}(i-1)$.

When $\hat{m}(i-1)$ is 0, the pdfs $f^{(00)}(y(i))$ and $f^{(10)}(y(i))$ are to be compared. Based on the two pdfs and the received signal y(i), the present transmission symbol may be estimated to have a relatively lower error rate.

For example, two values obtained by applying the received signal y(i) to the two pdfs may be compared and the transmission symbol m(i) of a larger value may be estimated to be the present transmission symbol. That is, when $f^{(00)}(y(i)) > f^{(10)}(y(i))$ is satisfied, m(i) may be estimated to be "0" and, in the opposite case, m(i) may be estimated to be "1."

Furthermore, information on an intersection between the two pdfs may be used. For example, the received signal y(i) corresponding to the intersection may be obtained as a threshold Y. When the received signal y(i) is smaller than the threshold Y, the transmission symbol m(i) may be estimated to be "0." In an opposite case, m(i) may be estimated to be "1." This process will be described with reference to FIG. 12.

Figure 12:
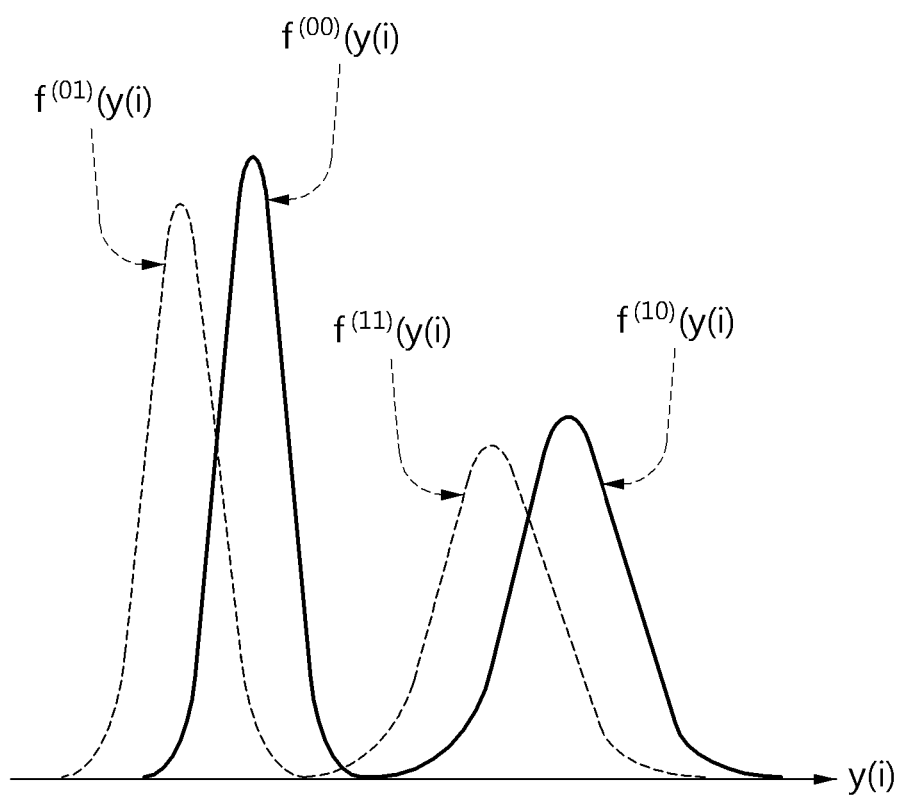
FIG. 12 is a diagram illustrating an example of a method to determine a data detection parameter when $\hat{m}(i-1)=0$ in a probability density function as an example of a probability distribution, in accordance with an illustrative configuration.

FIG. 12 illustrates an example of a method to determine a data detection parameter when $\hat{m}(i-1)=0$ in a probability density function as an example of a probability distribution, in accord with the method of adaptively setting a threshold to detect a transmission symbol, in accordance with an illustrative example.

Referring to FIG. 12, pdfs $f^{(00)}(y(i))$ and $f^{(10)}(y(i))$ shown by a solid line are to be compared when $\hat{m}(i-1)=0$.

Figure 13:
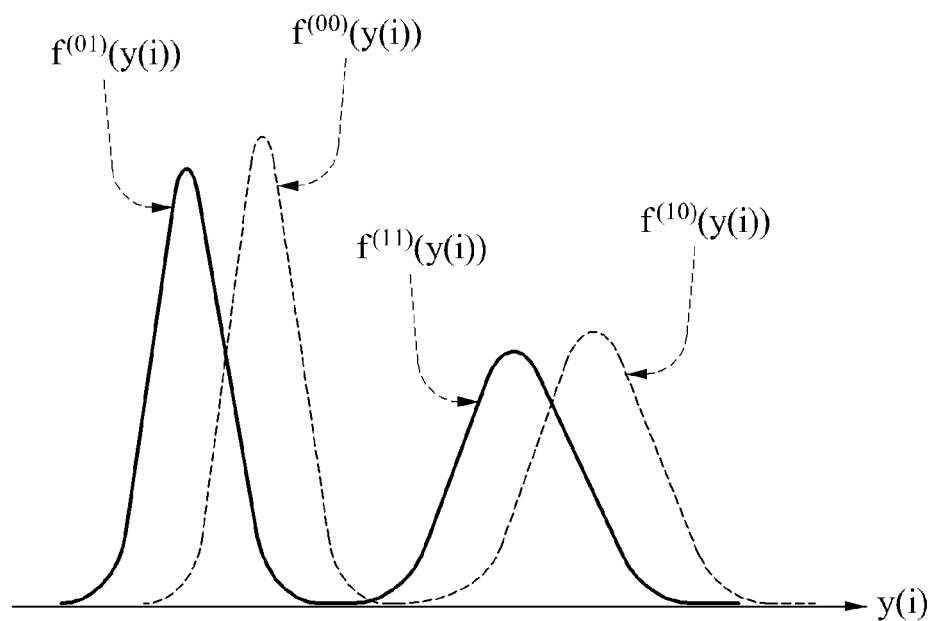
FIG. 13 is a diagram illustrating an example of a method to determine a data detection parameter when $\hat{m}(i-1)=1$ in a probability density function as an example of a probability distribution, in accordance with an illustrative configuration.

FIG. 13 illustrates an example of a method to determine a data detection parameter when $\hat{m}(i-1)=1$ in a probability density function as an example of a probability distribution, in accord with the method to adaptively set a threshold for detecting a transmission symbol, in accordance with an illustrative example.

Referring to FIG. 13, pdfs $f^{(01)}(y(i))$ and $f^{(11)}(y(i))$ shown by a solid line are to be compared when $\hat{m}(i-1)=1$. In a similar manner, the transmission symbol m(i) may be estimated through comparison of the two pdfs.

As can be appreciated from the various configurations described above, a threshold to estimate a present transmission symbol may be adaptively changed according to an estimated value of a previously detected transmission symbol. In one example, an initial previous symbol is to be set. Therefore, an initial value of the previously detected transmission symbol, that is, the initial transmission symbol may be set using a symbol value estimated in a predetermined time period or preamble period.

The method to adaptively set the threshold to detect the transmission symbol may be used in a receiver of which a DC offset fluctuates with time according to a degree of continuity of same transmission symbols.

In addition, according to the various configurations described above, feedback of information on the previously detected transmission symbol or symbol sequence is provided. Parameters of an algorithm to detect the present transmission symbol may be properly controlled using characteristics of statistical probability distributions varied according to a degree of continuity of the same transmission symbols. Accordingly, statistical characteristics of a presently received signal distorted by previous transmission symbols may be restored. As a result, by improving a bit error rate, transmission power of a transmitter may be reduced and reception sensitivity of a receiver may be increased.

The units and the modules described herein may be implemented using hardware components. For example, the modules and the units described above may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The modules and the units may run an operating system (OS) and one or more software applications that run on the OS. Each module and each unit also may access, store, manipulate, process, and create data in response to execution of the software. For purpose of simplicity, the description of each module and each unit is used as singular; however, one skilled in the art will appreciated that each module and each unit may include multiple processing elements and multiple types of processing elements. For example, each module and each unit may include multiple processors or a processor and a controller. In addition, different processing configurations are possible, such as parallel processors.

Software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus, comprising:
   a calculator configured to determine a threshold at which to detect a transmission symbol based on probability distribution parameters, the probability distribution parameters defining a statistical probability distribution of an input signal, to calculate data detection parameters; and
   a detector configured to detect a present transmission symbol using a previously detected transmission symbol and the data detection parameters,
   wherein the detector is configured to detect the present transmission symbol by selectively applying the data detection parameters based on a degree of continuity of the same bits in the previously detected transmission symbol.

2. The apparatus of claim 1, further comprising:
   an estimator configured to estimate the probability distribution parameters according to the statistical probability distribution based on a degree of continuity of transmission symbols in the input signal.

3. The apparatus of claim 1, further comprising:
   an estimator configured to estimate the probability distribution parameters according to the statistical probability distribution using a preamble according to a data pattern.

4. The apparatus of claim 1, wherein the detector comprises:
   a data detection parameter updater configured to update the data detection parameters based on a degree of continuity of same bits in the previously detected transmission symbol; and
   a present symbol detector configured to detect the present transmission symbol using the updated data detection parameters.

5. The apparatus of claim 4, wherein the detector further comprises:

an initial symbol setter configured to set an initial value of the previously detected transmission symbol using a symbol value estimated in a time period or a preamble period.

6. The apparatus of claim 4, wherein the data detection parameter updater is configured to construct a symbol or a symbol sequence using the previously detected transmission symbol, and to update the data detection parameters using the symbol or the symbol sequence.

7. The apparatus of claim 6, wherein the data detection parameter updater is configured to update the data detection parameter based on a probability distribution parameter corresponding to a first probability distribution of when the symbol or symbol sequence is identical to the present transmission symbol and a probability distribution parameter corresponding to a second probability distribution of when the symbol or the symbol sequence is different from the present transmission symbol.

8. The apparatus of claim 7, wherein the present symbol detector is configured to detect the present transmission symbol, based on the updated data detection parameter determined from the first probability distribution and the second probability distribution and information on a state of a present received signal.

9. The apparatus of claim 1, further comprising:
   a feedback transmitter configured to feed back information about the present transmission symbol.

10. A method, comprising:
    calculating data detection parameters, to determine a threshold to detect the transmission symbol, based on probability distribution parameters defining a statistical probability distribution of an input signal; and
    detecting a present transmission symbol using a previously detected transmission symbol and the data detection parameters,
    wherein the detecting the present transmission symbol comprises selectively applying the data detection parameters based on a degree of continuity of the same bits in the previously detected transmission symbol.

11. A method, comprising:
    determining a threshold at which to detect a transmission symbol based on probability distribution parameters defining a statistical probability distribution of an input signal, to calculate data detection parameters; and
    detecting a present transmission symbol using a previously detected transmission symbol and the data detection parameters,
    wherein the detecting comprises detecting the present transmission symbol by selectively applying the plurality of data detection parameters based on a degree of continuity of same bits in the previously detected transmission symbol.

12. The method of claim 11, further comprising:
    estimating the probability distribution parameters according to the statistical probability distribution based on a degree of continuity of transmission symbols in the input signal.

13. The method of claim 11, further comprising:
    estimating the probability distribution parameters according to the statistical probability distribution using a preamble according to a data pattern.

14. The method of claim 11, wherein the detecting comprises:
    updating the data detection parameters based on a degree of continuity of same bits in the previously detected transmission symbol; and adaptively detecting the present transmission symbol using the updated data detection parameters.

15. The method of claim 14, wherein the detecting further comprises:
setting an initial value of the previously detected transmission symbol using a symbol value estimated in a time period or a preamble period.

16. The method of claim 14, wherein the updating of the data detection parameters comprises:
constructing a symbol or a symbol sequence using the previously detected transmission symbol, and
augmenting the data detection parameters using the symbol or the symbol sequence.

17. The method of claim 16, wherein the augmenting of the data detection parameters comprises:
calculating the augmented data detection parameters based on a probability distribution parameter corresponding to a first probability distribution of when a symbol or a symbol sequence is identical to the present transmission symbol and a probability distribution parameter corresponding to a second probability distribution of when the symbol or symbol sequence is different from the present transmission symbol, with respect to a previously detected transmission symbol or symbol sequence candidates randomly constructed; and
determining the augmented data detection parameters based on the symbol or the symbol sequence previously detected from the calculated data detection parameters.

18. The method of claim 17, wherein the detecting of the present transmission symbol comprises:
detecting the present transmission symbol, based on the data detection parameter determined from the first probability distribution and the second probability distribution and information on a state of a present received signal.

19. The method of claim 11, further comprising:
feeding back information about the present transmission symbol.

20. A non-transitory computer readable recording medium storing a program to implement the method of claim 11.

* * * * *